Jan. 11, 1938.   J. L. JONES   2,104,750
WELDING APPARATUS
Filed Nov. 8, 1935
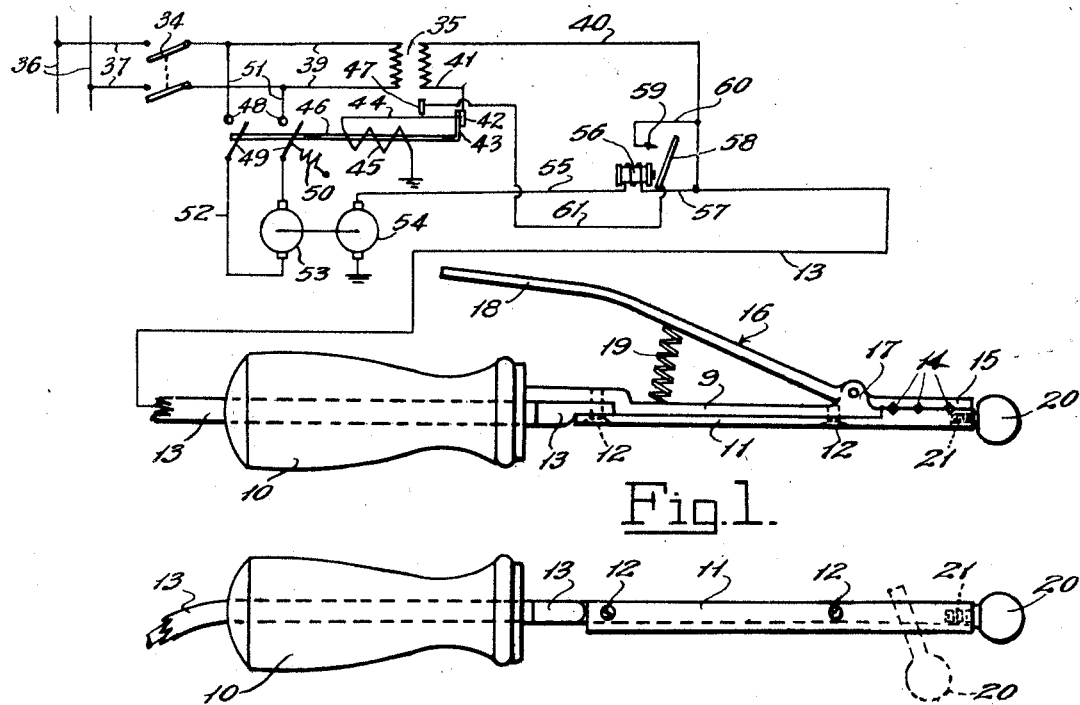
Fig. 1.
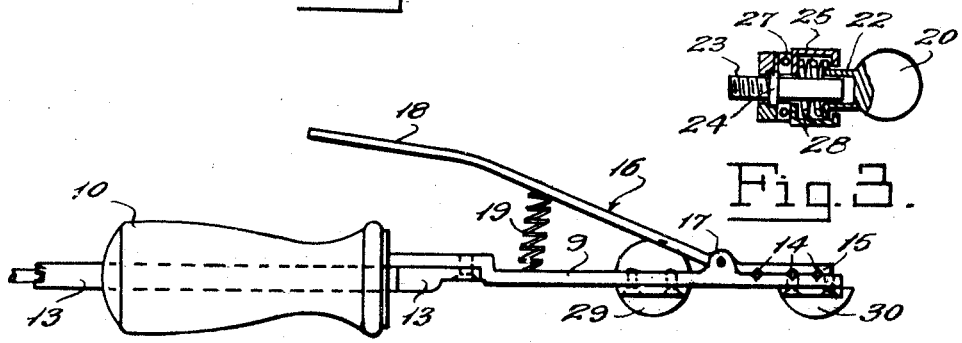
Fig. 2.
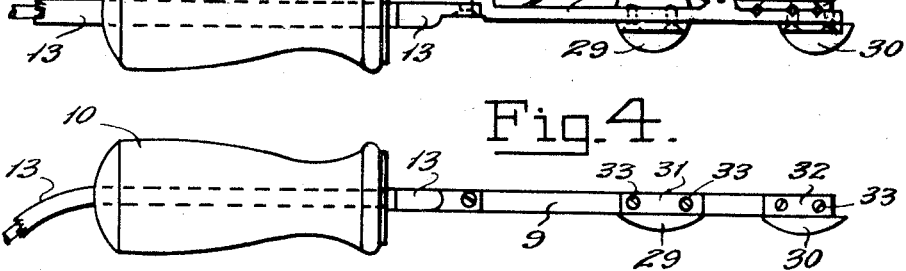
Fig. 3.
Fig. 4.
Fig. 5.
JAMES L. JONES
INVENTOR
BY Robert A. Lavender
ATTORNEY Patented Jan. 11, 1938

2,104,750

UNITED STATES PATENT OFFICE 2,104,750

WELDING APPARATUS

James L. Jones, Washington, D. C.

Application November 8, 1935, Serial No. 48,847

6 Claims. (Cl. 219—8)

(Granted under the act of March 3, 1883, as amended April 30, 1928; 370 O. G. 757)

This invention relates to welding apparatus and it has a particular relation to electrode holders therefor.

Heretofore it has been the practice of many operators in initially striking the welding arc or in adjusting the current to contact the electrode holder with ground. The resultant arc causes the holder to become fused and burned, which materially shortens its useful life. This is particularly noticeable when the circuit is broken during remote starting of the motor of the motor generator set, as outlined in applicant's copending application for Letters Patent of the United States, Serial No. 639,491.

One of the objects of the present invention is the provision of an improved electrode holder of the character described, equipped with a renewable contact element, or elements, adapted to be contacted with ground in order to strike the arc so as to confine the burning and other damage to these replaceable elements.

With these and other objects in view, as well as other advantages which may be incident to the use of the improvements, the invention consists of the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawing means for carrying the invention into practical effect, without limiting the improvements in their useful application to the particular construction, which, for purposes of explanation, have been made the subject of illustration.

In the accompanying drawing:

Fig. 1 is a plan view of an electrode holder constructed in accordance with the present invention, said holder being supplied with welding current from a circuit diagrammatically illustrated as including a motor generator set, transformer and associated switches;

Fig. 2 is a side elevational view of the holder shown in Fig. 1;

Fig. 3 is a view, partly in elevation and partly in section, of a modified form of replaceable contact member;

Fig. 4 is a plan view of an electrode holder provided with another type of replaceable contact member; and Fig. 5 is a side elevational view of the structure shown in Fig. 4.

Referring to the drawing, an electrode holder constructed in accordance with the present invention is shown as comprising a shank portion 9 provided with a handle 10 and having a renewable contact member 11 of conducting metal such as copper secured thereto by screws 12. One end of the member 11 is fixed to a cable 13 which is connected to a suitable source of electrical energy hereinafter to be described, and its outer end is formed with a plurality of notches 14 which register with a plurality of similar notches formed in the outer end 15 of a lever 16. This lever is pivotally mounted intermediate its end between ears 17 formed on the shank 9 and is provided with a handle 18, which is normally urged outwardly by a spring 19. Thus, the outer ends of the member 11 and the lever 16 constitute coacting jaws adapted to yieldably grip an electrode (not shown), which is positioned within the notches 14. In this particular construction when it is desired to strike an arc the renewable contact member 11 only is contacted with a grounded object so that any burning resulting from the initial arc is confined to this member.

If desired, a replaceable contact 20 of spherical shape and having a threaded stem portion 21 may be threaded into the end of the member 11 or gripped by the jaws of the holder, as indicated by the dotted lines in Fig. 2.

This spherical contact member 20 may be constructed as shown in Fig. 3, in which it is formed with a tubular flanged sleeve 22 which telescopes without a stem 23 for threaded engagement with the end of the member 11 and provided with a collar 24. The contact member is yieldably held in position by a two-part housing 25 which engages without the flange on the sleeve 22 and the collar 24 and the halves are secured together by bolts 27. A spring 28 surrounds the stem 23 between one end of the housing 25 and the end of the sleeve 22 and permits of a limited degree of swivel movement of the contact 20. This resilient mounting of the contact 20 minimizes the tendency for it to break if subjected to excessive shock when the operator strikes an arc.

In Figs. 4 and 5 a still further modified construction is illustrated, wherein renewable contacts 29 and 30 of discoidal shape are mounted on the shank 11 of the holder at right angles to one another. These contacts are preferably formed with flanges 31 and 32 respectively, which are removably secured to the shank by screws 33. By means of this construction an arc may be struck by grounding the circuit by either a vertical or lateral movement of the holder.

The welding electrode may be supplied with current by means of a circuit such as that diagrammatically illustrated in Fig. 1. With reference to this figure, the closing of a switch 34 causes the primary winding of a transformer 35 to be energized by alternating current supplied thereto from line wires 36, wires 37, switch 34 and wires 39. With this condition existing, the grounding of the contact on the holder will establish a circuit from one terminal of the secondary winding of transformer 35, through wires 40, cable 13 and contact 20 to ground and from the other terminal of the secondary winding of transformer 35 through wire 41, contacts 42 and 43, wire 44 and winding of solenoid 45 to ground. This will cause an arc between contact 20 and the grounded surface which is transferred to the welding electrode by a turning movement of the holder in a well known manner. The completion of this circuit also energizes the solenoid 45 which retracts its armature 46 so as to open the contacts 42 and 43 and to close contacts 43 and 47, and also closes contacts 48 and 49 against the action of spring 50. This opens the circuit just traced through the welding contact 20 but establishes a new circuit from the line wires 36, wires 37, switch 34, wires 39 and 51, contacts 48 and 49, wire 52 and winding of an alternating current motor 53 energizing the same. The motor 53 drives a direct current generator 54 which now supplies direct current through wire 55, winding of relay 56, energizing the same, wire 57, cable 13 and welding electrode to ground, thus maintaining the welding arc, but in this case by direct current. The energizing of relay 56 closes contacts 58—59 and establishes a parallel holding circuit from wire 57, through wires 60 and 40, contacts 58—59, wire 61, contacts 43—47, wire 44 and winding of solenoid 45 to ground, thus holding contacts 43—47 closed.

The circuit last traced constitutes the main welding circuit and continues to supply direct current to the welding electrode until the circuit is broken either by the removal of the electrode from welding position or by the opening of the switch 34. The circuit hereinabove constitutes no part of the present invention, but is the subject of applicant's copending application previously referred to.

Other modifications and changes in the proportion and arrangement of the parts, other than those herein described, may be made by those skilled in the art without departing from the nature and scope of the invention as defined in the appended claims.

The invention described herein may be manufactured and used by or for the Government of the United States of America for governmental purposes without the payment of any royalties thereon or therefor.

I claim:

1. An electric welding device comprising an electrode holder, and a plurality of contact plates removably secured to said holder with the planes thereof disposed at right angles to one another and adapted to be grounded to produce the initial arc and to receive any burning or fusing caused thereby.

2. An electric welding device comprising an electrode holder and a plurality of discoidal contact elements removably secured to said holder with the planes thereof disposed at right angles to one another and adapted to be grounded to produce the initial arc and to receive any burning or fusing caused thereby.

3. An electric welding device comprising an electrode holder, and a contact element resiliently mounted on said holder and connected in the welding circuit, said contact being adapted to be grounded to produce the initial arc and to receive any burning or fusing caused thereby.

4. An electric welding device comprising an electrode holder, and a spherical contact element resiliently mounted on said holder and connected in the welding circuit, said contact being adapted to be grounded to produce the initial arc and to receive any burning or fusing caused thereby.

5. An electric welding device comprising an electrode holder, and a plurality of contact plates removably secured to said holder with the planes thereof disposed at an angle to one another and adapted to be grounded to produce the initial arc and to receive any burning or fusing caused thereby.

6. An electric welding device comprising an electrode holder and a plurality of discoidal contact elements removably secured to said holder with the planes thereof disposed at an angle to one another and adapted to be grounded to produce the initial arc and to receive any burning or fusing caused thereby.

JAMES L. JONES.